(12) United States Patent
Dennis et al.

(10) Patent No.: US 10,970,273 B2
(45) Date of Patent: *Apr. 6, 2021

(54) AIDING RESOLUTION OF A TRANSACTION

(71) Applicant: International Business Machines Corporation, Armonk, NY (US)

(72) Inventors: Paul S. Dennis, Hursley Park (GB); Stephen J. Hobson, Hursley Park (GB); Pete Siddall, Hursley Park (GB); Jamie P. Squibb, Hursley Park (GB); Philip G. Willoughby, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 771 days.

This patent is subject to a terminal disclaimer.

(21) Appl. No.: 14/864,043

(22) Filed: Sep. 24, 2015

(65) Prior Publication Data

US 2016/0232199 A1 Aug. 11, 2016

Related U.S. Application Data

(63) Continuation of application No. 12/841,288, filed on Jul. 22, 2010, now Pat. No. 9,201,684.

(30) Foreign Application Priority Data

Aug. 28, 2009 (GB) ..................................... 9168945

(51) Int. Cl.
*G06F 16/23* (2019.01)
*G06F 11/14* (2006.01)
(Continued)

(52) U.S. Cl.
CPC .......... *G06F 16/2379* (2019.01); *G06F 9/466* (2013.01); *G06F 9/526* (2013.01);
(Continued)

(58) Field of Classification Search
None
See application file for complete search history.

(56) References Cited

U.S. PATENT DOCUMENTS 5,327,532 A 7/1994 Ainsworth et al.
5,745,674 A * 4/1998 Lupton ............... G06F 11/1471
714/20

(Continued)

OTHER PUBLICATIONS

Franaszek, "Distributed Concurrency Control Based on Limited Wait-Depth," 1993, IEEE Transactions on Parallel and Distributed Systems, vol. 4, No. 11, pp. 1246-1264 (Year: 1993).*

(Continued)

*Primary Examiner* — Ivan R Goldberg
(74) *Attorney, Agent, or Firm* — Timothy J. Singleton

(57) ABSTRACT

A method for aiding resolution of a transaction for use with a transactional processing system comprising a transaction coordinator and a plurality of grouped and inter-connected resource managers, the method comprising the steps of: in response to a communications failure between the transaction coordinator and a first resource manager causing a transaction to have an in-doubt state, connecting, by the transaction coordinator, to a second resource manager; in response to the connecting step, sending by the transaction coordinator to the second resource manager, a resolve request comprising a resolution for the in-doubt transaction; in response to the resolve request, obtaining at the first resource manager, by the second resource manager, a lock to data associated with the in-doubt transaction; and in response to the obtaining step, determining, by the second resource manager, whether the transaction is associated with the first resource manager.

20 Claims, 8 Drawing Sheets

(51) Int. Cl.
    *G06F 9/46*     (2006.01)
    *G06F 9/52*     (2006.01)

(52) U.S. Cl.
    CPC ...... *G06F 11/1471* (2013.01); *G06F 11/1474* (2013.01); *G06F 16/2343* (2019.01); *Y10S 707/99938* (2013.01)

(56) References Cited

U.S. PATENT DOCUMENTS

| | | | |
|---|---|---|---|
| 5,745,747 A * | 4/1998 | Chang | G06F 9/466 |
| 5,835,766 A * | 11/1998 | Iba | G06F 9/466 |
| | | | 718/104 |
| 6,105,147 A | 8/2000 | Molloy | |
| 6,145,094 A * | 11/2000 | Shirriff | G06F 11/2038 |
| | | | 709/226 |
| 6,154,847 A * | 11/2000 | Schofield | G06F 11/1471 |
| | | | 714/20 |
| 6,625,601 B1 | 9/2003 | Molloy | |
| 6,732,124 B1 | 5/2004 | Koseki et al. | |
| 2002/0066051 A1 | 5/2002 | Hobson et al. | |
| 2002/0083078 A1 | 6/2002 | Pardon et al. | |
| 2003/0154423 A1 | 8/2003 | Egolf et al. | |
| 2003/0191782 A1 | 10/2003 | Buxton et al. | |
| 2004/0068501 A1 | 4/2004 | McGoveran | |
| 2004/0215998 A1 | 10/2004 | Buxton et al. | |
| 2004/0225915 A1 | 11/2004 | Johnson et al. | |
| 2005/0015353 A1 * | 1/2005 | Kumar | G06F 9/466 |
| 2005/0262182 A1 * | 11/2005 | Thole | G06F 9/466 |
| | | | 709/200 |
| 2006/0075277 A1 * | 4/2006 | Johnson | G06F 11/1474 |
| | | | 714/4.1 |
| 2007/0072163 A1 | 3/2007 | Groff | |
| 2007/0174185 A1 | 7/2007 | McGoveran | |
| 2007/0260908 A1 | 11/2007 | Mitchell et al. | |
| 2008/0040729 A1 | 2/2008 | Gazra | |
| 2008/0208977 A1 | 8/2008 | Gazra | |
| 2008/0235295 A1 | 9/2008 | Parkinson | |
| 2009/0043845 A1 * | 2/2009 | Garza | G06Q 10/10 |
| | | | 709/204 |
| 2010/0017642 A1 * | 1/2010 | Myers | G06F 11/0709 |
| | | | 714/2 |

OTHER PUBLICATIONS

Zhao, "Unification of Transactions and Replication in Three-Tier Architectures Based on CORBA," 2005, IEEE Transactions on Dependable and Secure Computing, vol. 2, No. 1, pp. 20-33 (Year: 2005).*

* cited by examiner

AIDING RESOLUTION OF A TRANSACTION

This application is a continuation to commonly assigned and co-pending U.S. patent application Ser. No. 12/841,288 entitled "AIDING RESOLUTION OF A TRANSACTION" filed on Jul. 22, 2010, hereby incorporated by reference, as well as claims benefit of priority of Foreign Patent Application No. 09168945.5, filed in the European Patent Office on Aug. 28, 2009, which is herein incorporated by reference.

BACKGROUND

The present invention relates generally to the field of transaction processing, a communication protocol (known as two-phase commit) is used to coordinate transactions.

FIG. 1 is a block diagram of a transaction processing system 100, wherein a first data processing system 105 comprises an owning application 110 and a second data processing system 115 comprising a transaction coordinator 120 for executing transactions. There is also shown a third data processing system 130 comprising a first resource manager 135 for managing a first resource (e.g. a database). There is also shown a fourth data processing system 140 comprising a second resource manager 145 for managing a second resource (e.g. a database).

The system 100 also comprises a first log, a second log and a third log 125, 150 and 155 to which the transaction coordinator 120, the first resource manager 135 and the second resource manager 145 can respectively write one or more log records (i.e. wherein a log record comprises data associated with a transaction.

When an application wishes to "commit" a transaction, the transaction coordinator 120 requests each resource manager involved in the transaction to "prepare".

Following preparation, each resource manager responds to the transaction coordinator that they have prepared to commit the transaction and responsive to receiving the responses, the transaction coordinator 120 asks each of the resource managers to commit the transaction. In response to committing the transaction, each resource manager reports back to the transaction coordinator 120 which subsequently records the transaction as committed.

If a resource manager fails to respond positively to the prepare request, the transaction coordinator 120 issues a "roll-back" decision to the remaining resource managers. In response to rolling back the transaction, each resource manager reports back to the transaction coordinator 120 which subsequently records the transaction as rolled-back.

Upon receipt of the resolution decision (i.e. commit or rollback) from the coordinator a resource manager has to log the decision for its own recovery purposes and it must also commit or rollback the changes made to associated resources.

It should be understood that when a transaction is between the "prepare" phase and the "commit" or "roll-back" phase, it is known as "in-doubt".

In environments today, resource managers can be grouped and freely interchangeable such that one resource manager can take over responsibilities of another resource manager in the group. Such an environment allows for high availability in the event of failure of e.g. the another resource manager and also allows for load balancing between multiple resource managers as there can be two or more resource managers which could each perform the work required by a transaction.

In such an environment, there is a need for a mechanism to resolve transactions quickly; without data loss and without requiring significant changes to the transaction processing system.

U.S. Patent Publication No. 20080235295, Ser. No. 11/723,274, discloses a system, wherein recovery of inflowed transactions is provided by any instance in a cluster, along with peer recovery of transactions in a cluster, and administrative functionality related to these aspects. A method of managing transaction processing comprises performing transaction processing using a first process, wherein the first process logs the transaction processing that it performs, detecting failure of the first process, wherein the transaction logs of the first process are locked, taking ownership of the locked transaction logs of the first process at a second process, unlocking the locked transaction logs of the first process for use by the second process, and recovering at least one transaction using the transaction logs.

SUMMARY

The present invention provides according to a first aspect, a computer implemented method for aiding resolution of a transaction for use with a transactional processing system comprising a transaction coordinator and a plurality of grouped and inter-connected resource managers, the method comprising the steps of: in response to a communications failure between the transaction coordinator and a first resource manager causing a transaction to have an in-doubt state, connecting, by the transaction coordinator, to a second resource manager; in response to the connecting step, sending by the transaction coordinator to the second resource manager, a resolve request comprising a resolution for the in-doubt transaction; in response to the resolve request, obtaining at the first resource manager, by the second resource manager, a lock to data associated with the in-doubt transaction; and in response to the obtaining step, determining, by the second resource manager, whether the transaction is associated with the first resource manager.

According to a second aspect, there is provided an apparatus for aiding resolution of a transaction for use with a transactional processing system comprising a transaction coordinator and a plurality of grouped and inter-connected resource managers, the apparatus comprising: means, responsive to a communications failure between the transaction coordinator and a first resource manager causing a transaction to have an in-doubt state, for causing the transaction coordinator to connect to a second resource manager; means, responsive in response to the connecting means, for causing the transaction coordinator to send, to the second resource manager, a resolve request comprising a resolution for the in-doubt transaction; means, responsive to the resolve request, for causing the second resource manager to obtain, at the first resource manager, a lock to data associated with the in-doubt transaction; and means, responsive to the obtaining means, for causing the second resource manager to determine whether the transaction is associated with the first resource manager.

According to a third aspect, there is provided a computer program comprising program code means adapted to perform all the steps of the method above when the program is run on a computer.

BRIEF DESCRIPTION OF THE DRAWINGS

The present invention will now be described, by way of example only, with reference to preferred embodiments thereof, as illustrated in the following drawings.

DETAILED DESCRIPTION

Figure 2:
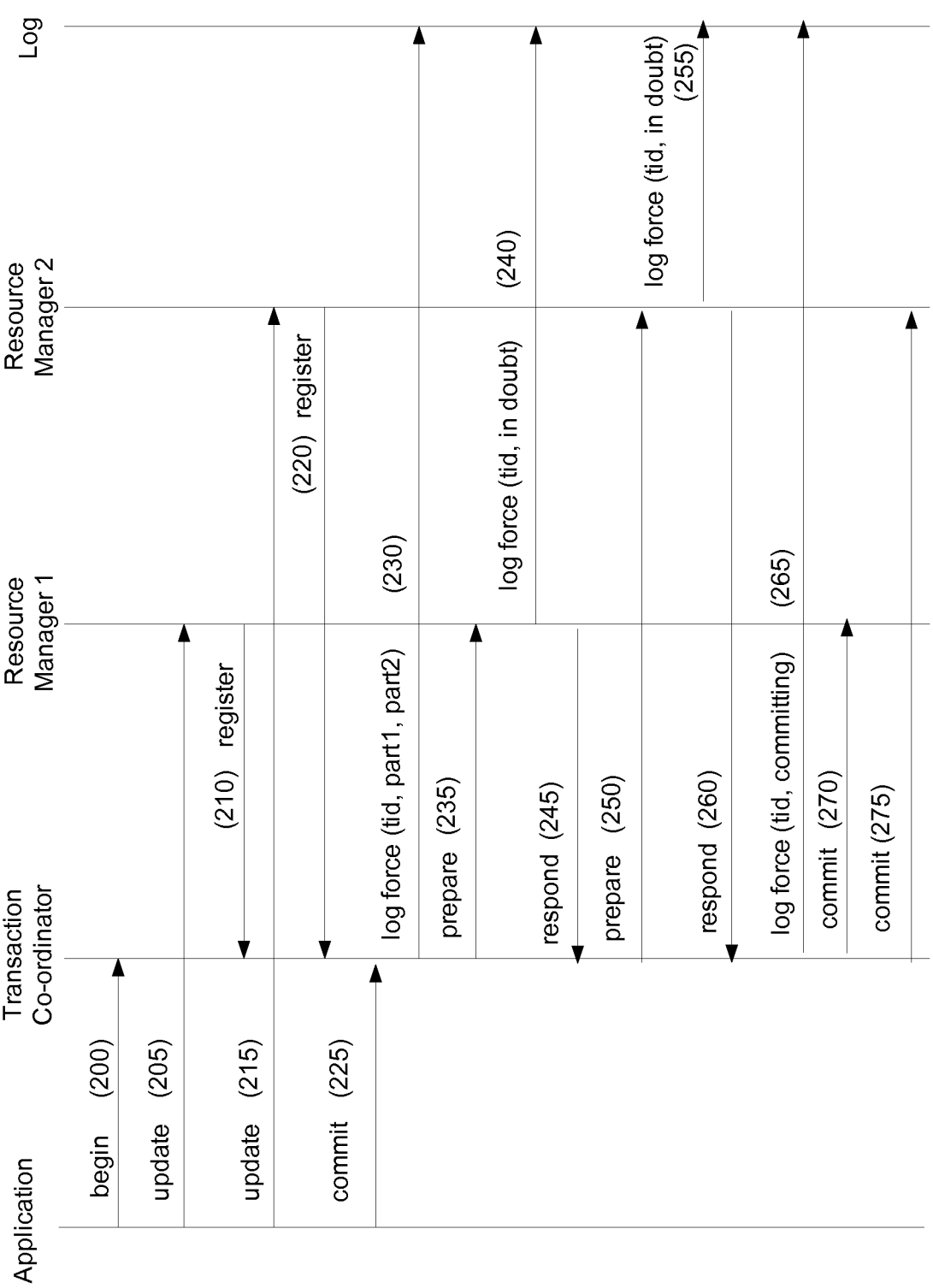
FIG. 2 is a flow chart showing the operational steps involved in a prior art transaction processing process.

FIG. 2 is a schematic diagram of the components involved in an example transaction and the flows involved between the components, according to the prior art, according to a two-phase commit protocol.

Figure 1:
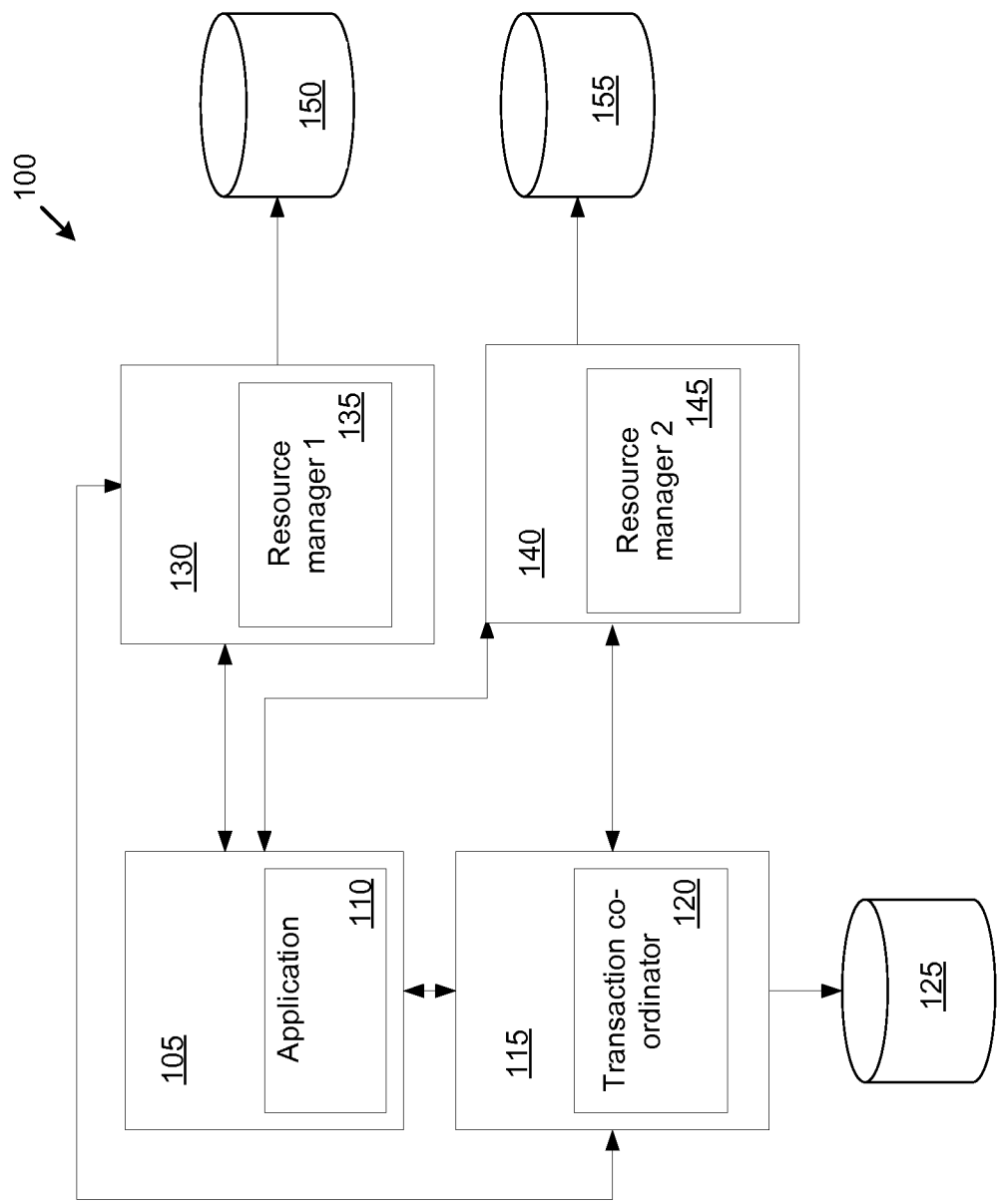
FIG. 1 is a block diagram of a prior art transaction processing system.

With reference to FIG. 1 also, firstly, the application 110 flows a begin request 200 to the transaction coordinator 120, which indicates the start of a transaction.

Next, the application 110 sends an update request 205 (that is, a request that makes a change to a resource manager), to the first resource manager 135. In response to receiving the update request, the first resource manager 135 registers 210 as a resource manager in the transaction with the transaction coordinator 120 and receives a transaction identifier of the transaction in response.

Next, the application sends an update request 215 to the second resource manager 145. In response to receiving the update request, the second resource manager 145 registers 220 as a resource manager in the transaction with the transaction coordinator 120 and receives a transaction identifier of the transaction in response.

Note that alternatively to the "dynamic" registration process described, "static" registration can also take place during the begin phase (step 200) (e.g. wherein, the transaction coordinator 120 informs each resource manager of the transaction identifier and may or may not involve each resource manager in the transaction).

In response to the first resource manager 135 and the second resource manager 145 successfully performing the update requests, the application 110 sends a commit request 225 to the transaction coordinator 120. The application 110 does not regain control until commit processing completes.

In response to the commit request 225 from the application 110, the transaction coordinator 120 force writes 230 a first log record to its log 125, wherein the first log record comprises an identifier associated with the transaction, an identifier associated with the first resource manager 135 and an identifier associated with the second resource manager 145.

Note that the first resource manager 135 does not have data associated with the second resource manager 145 and vice versa. Thus, only the transaction coordinator has data associated with resource managers in a transaction. Note that a forced write does not return until the data written is hardened to non-volatile storage.

Next, once the forced log write completes (guaranteeing that the data is stored in non-volatile storage), the transaction coordinator 120 flows a prepare request 235 to the first resource manager 135. It should be understood that a resource manager, after being involved in the transaction, assumes rollback until it receives a prepare request. In other words if the resource manager chooses to take unilateral action for the transaction, after being involved in a transaction and before receiving a prepare request, it should rollback updates associated with the transaction.

In response to receiving the prepare request, the first resource manager 135 force writes 240 a second log record to its log 150, wherein the second log record comprises the transaction identifier received in response to the register request and a state associated with the transaction, namely, "in doubt". This state indicates that the first resource manager 135 can no longer assume rollback but needs to wait to be informed of a transaction outcome.

Next, the first resource manager 135 sends 245 a response to the prepare request to the transaction coordinator 120, indicating that the first resource manager 135 can successfully participate in the transaction. It should be understood, that if the first resource manager 135 cannot successfully participate in the transaction, it should roll back any updates it performed and send a rollback response.

Next, the transaction coordinator 120 flows a prepare request 250 to the second resource manager 145. In response to receiving the prepare request, the second resource manager 145 force writes 255 a third log record to its log 155, wherein the third log record comprises the transaction identifier and a state associated with the transaction, namely, "in doubt". This state indicates that the second resource manager 145 can no longer assume rollback but needs to wait to be informed of the transaction outcome.

Next, the second resource manager 145 sends 260 a response to the transaction coordinator 120, indicating that the second resource manager 145 can successfully participate in the transaction. It should be understood, that if the second resource manager 145 cannot successfully participate, it should roll back any updates it performed and send a rollback response.

The transaction coordinator 120 collects the responses and force writes 265 a fourth log record to its log 125, wherein the fourth log record comprises the transaction identifier and a computed decision associated with the transaction. Assuming that all resource managers responded that they can commit, the decision is commit. If one or more resource managers responded that they have rolled back, the decision is rollback.

Next, the transaction coordinator 120 flows a decision (e.g. commit request 270) to the first resource manager 135 and a commit request 275 to the second resource manager 145, indicating to the resource managers that they should commit the transaction.

After, the transaction has been committed (or rolled back, depending on the decision), the transaction coordinator and the resource managers "forget" the transaction, resulting in associated log records becoming eligible for purging.

In the event of a resource manager failing to resolve the transaction (e.g. due to the resource manager failing; the communication channel between the transaction coordinator and the resource manager failing) and the transaction being in doubt, there is a need for a resolution process to be put into place.

In environments, wherein resource managers can be grouped and freely interchangeable, there is a need to be able to resolve an in-doubt transaction quickly; without data loss and without requiring significant changes to the transaction processing system.

Figure 3:
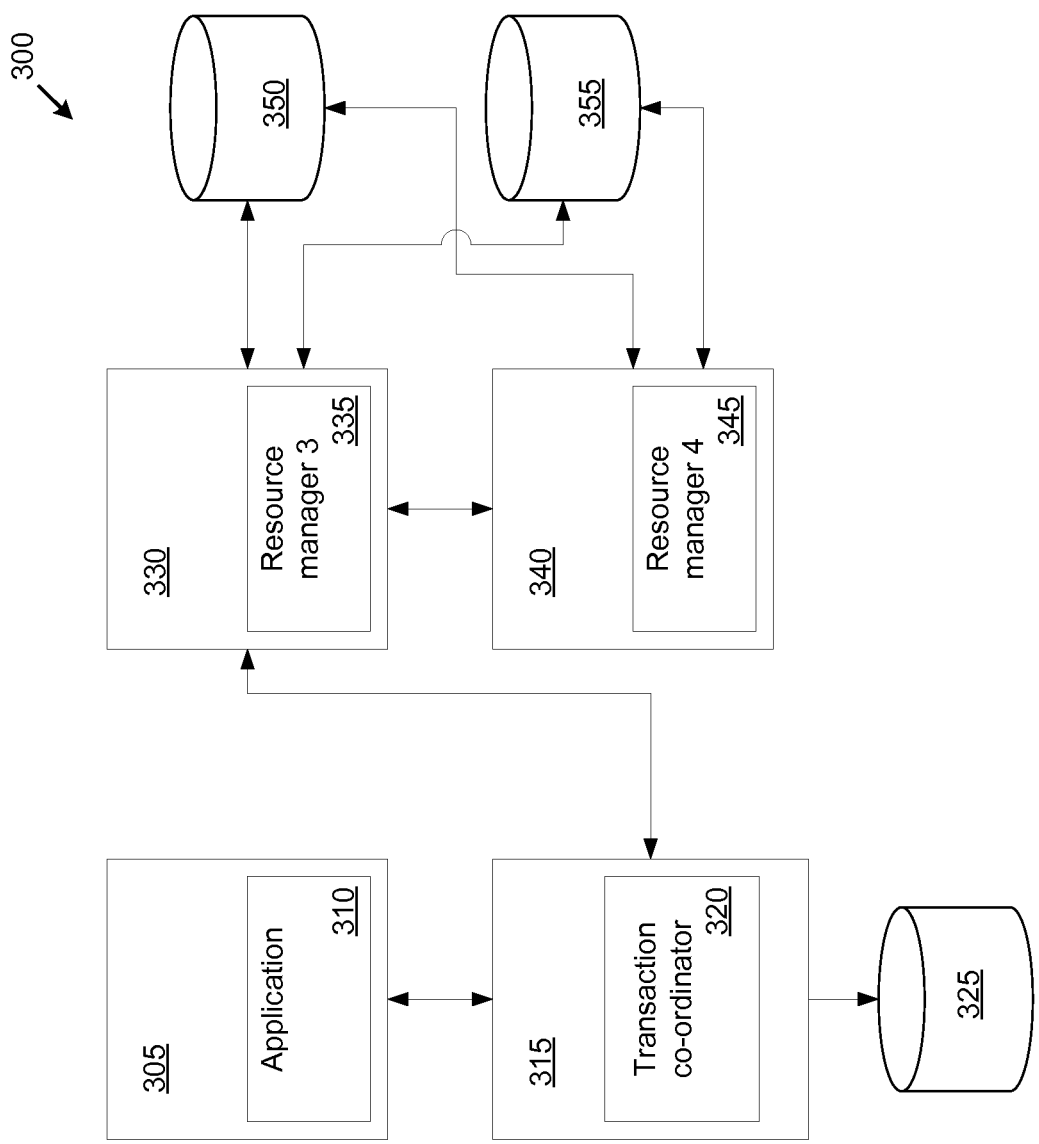
FIG. 3 is a block diagram of a transaction processing system according to the preferred embodiment.

A transaction processing system 300 according to the preferred embodiment will now be described with reference to FIG. 3.

The system 300 comprises a fifth data processing system 305 comprising an owning application 310 and a sixth data processing system 315 comprising a transaction coordinator 320 having a first log 325.

The system 300 also comprises a seventh data processing system 330 comprising a third resource manager 335 for managing a third resource and an eighth data processing system 340 comprising a fourth resource manager 345 for managing a fourth resource.

Each of the resource managers comprises an associated log 350 and 355 and each of the resource managers is modified to access the other resource manager and to access the other resource manager's log.

Preferably, the resource managers can be grouped and are freely interchangeable.

The transaction coordinator 320 is modified to be able to connect to any one of the resource managers.

Figure 4:
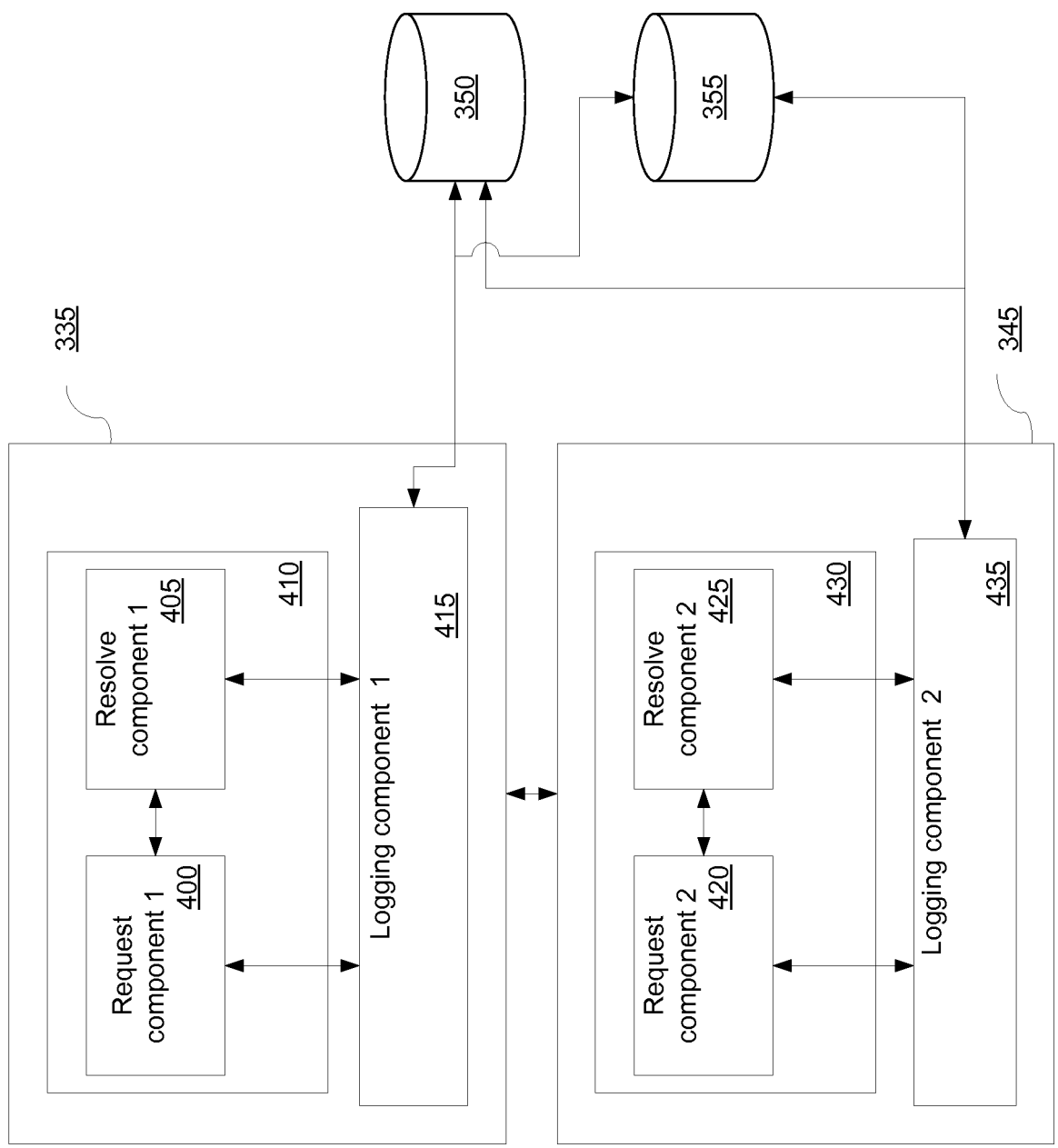
FIG. 4 is a block diagram of a resource manager of the system in FIG. 3 according to the preferred embodiment.

A resource manager according to the preferred embodiment is shown in more detail in FIG. 4.

Each of the resource managers 335 and 345 comprises: a recovery component 410 and 430 having a request component 400 and 420 operable to perform read/write operations and a resolve component 405 and 425 operable to perform read/write operations; and a logging component 415 and 435 operable to access a log that is associated with the resource manager as well as a log that is associated with the other resource manager.

A first process according to the preferred embodiment will be described with reference to FIG. 5A, wherein prior to processing, a failure occurs and the transaction is in doubt.

The transaction coordinator 320 queries at least one resource manager in the group to request a list of in-doubt transactions associated with the resource manager and each other resource manager in the group. In response to receiving the list, the transaction coordinator 320 compares identifiers of the in-doubt transactions with its own list and if it finds a matching identifier, the transaction coordinator 320 reads the associated entry in order to determine the decision (e.g. commit or roll back) associated with the transaction.

The transaction coordinator 320 attempts to reconnect to a resource manager in the group of freely interchangeable resource managers in order to resolve the transaction.

At step 500, in the example, the transaction coordinator 320 connects to a first resolve component 405 of the third resource manager 335 and sends a request requesting that a transaction having an identifier (e.g. T_1) should be resolved with the determined decision.

At step 505, the first resolve component 405 passes the request to the first logging component 415.

Responsive to receiving the request sent at step 505, the first logging component 415 accesses a fourth log 350 local to the third resource manager 335. In the example, reads the fourth log 350 to search for the transaction identifier, T_1.

At step 515, if the transaction identifier is found, local resolution is invoked (step 520) at the third resource manager 335, e.g. the first logging component 415 checks whether the associated entry has an in-doubt state and if the associated entry is not in an in-doubt state, the first logging component 415 reads the transaction state. However, if the associated entry is in an in-doubt state, the first logging component 415 writes the decision to the entry associated with the transaction identifier in order to resolve the transaction.

Prior to step 525, the first logging component 415 sends a result of any read or write operations to the first resolve component 405 which subsequently sends (step 525) the result in a response to the transaction coordinator 320.

Preferably, each result comprises:

1) a notification indicating that the transaction was resolved successfully; or 2) a notification indicating that the transaction was not resolved successfully and that the transaction coordinator must retry the resolution process; or 3) a notification indicating that the resource manager did not find the transaction identifier; or 4) a notification indicating that the resource manager did find the transaction identifier, that the transaction was not in doubt and the outcome of the transaction.

At step 515, if the transaction identifier is not found, control passes to step 530 where the first resolve component 405 determines whether there are any further resource managers in the group. Advantageously, the checks associated with any active or inactive resource managers allow for processing to continue until either the transaction identifier has been found or each of the resource managers in the group have been analyzed.

In response to a determination that there are no further resource managers in the group, the first logging component 415 sends a result 3) above to the first resolve component 405 which subsequently sends (step 525) the result in a response to the transaction coordinator 320.

In response to a determination that there are further resource managers in the group, for each other resource manager in the group (namely, in the example, the fourth resource manager 345), the first resolve component 405 determines whether the each other resource manager in the group is active e.g. using an operating facility which tracks the status of a resource manager; using a heartbeat mechanism (and retaining a determined status in a data structure).

For each active resource manager, a first request component 400 issues a read operation and responsively, the first logging component 415 makes a call to the active resource manager to search for the transaction identifier.

If the transaction identifier is found, the first logging component 415 makes a call to the active resource manager to determine whether the transaction is in doubt. If the transaction is not in doubt, the first logging component 415 requests (or reads) the transaction state. However, if the transaction is in doubt, the first logging component 415 makes a call to the active resource manager requesting it to write the decision in its log and commit or roll back changes to resources. The first logging component 415 sends a result of any read or write operations to the first resolve component 405 which subsequently sends (step 525) the result in a response to the transaction coordinator 320.

If the transaction identifier is not found, the first resolve component 405 determines whether there are any further inactive resource managers in the group.

In response to a determination that there are no further inactive resource managers in the group, the first logging component 415 sends a result 3) above to the first resolve component 405 which subsequently sends (step 525) the result in a response to the transaction coordinator 320.

Figure 6:
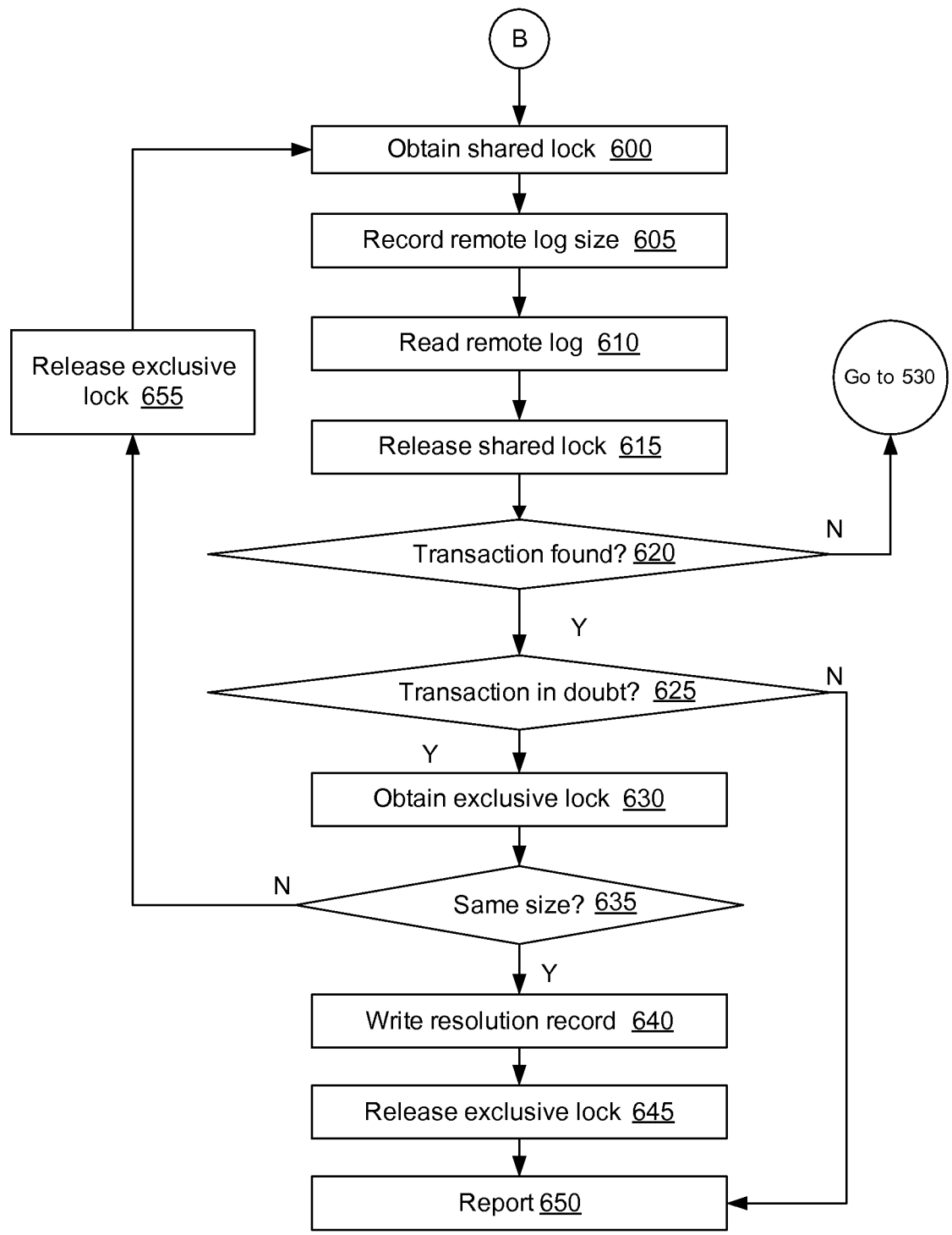
FIG. 6 is a flow chart showing the operational steps involved in a third transaction processing process.
Figure 7:
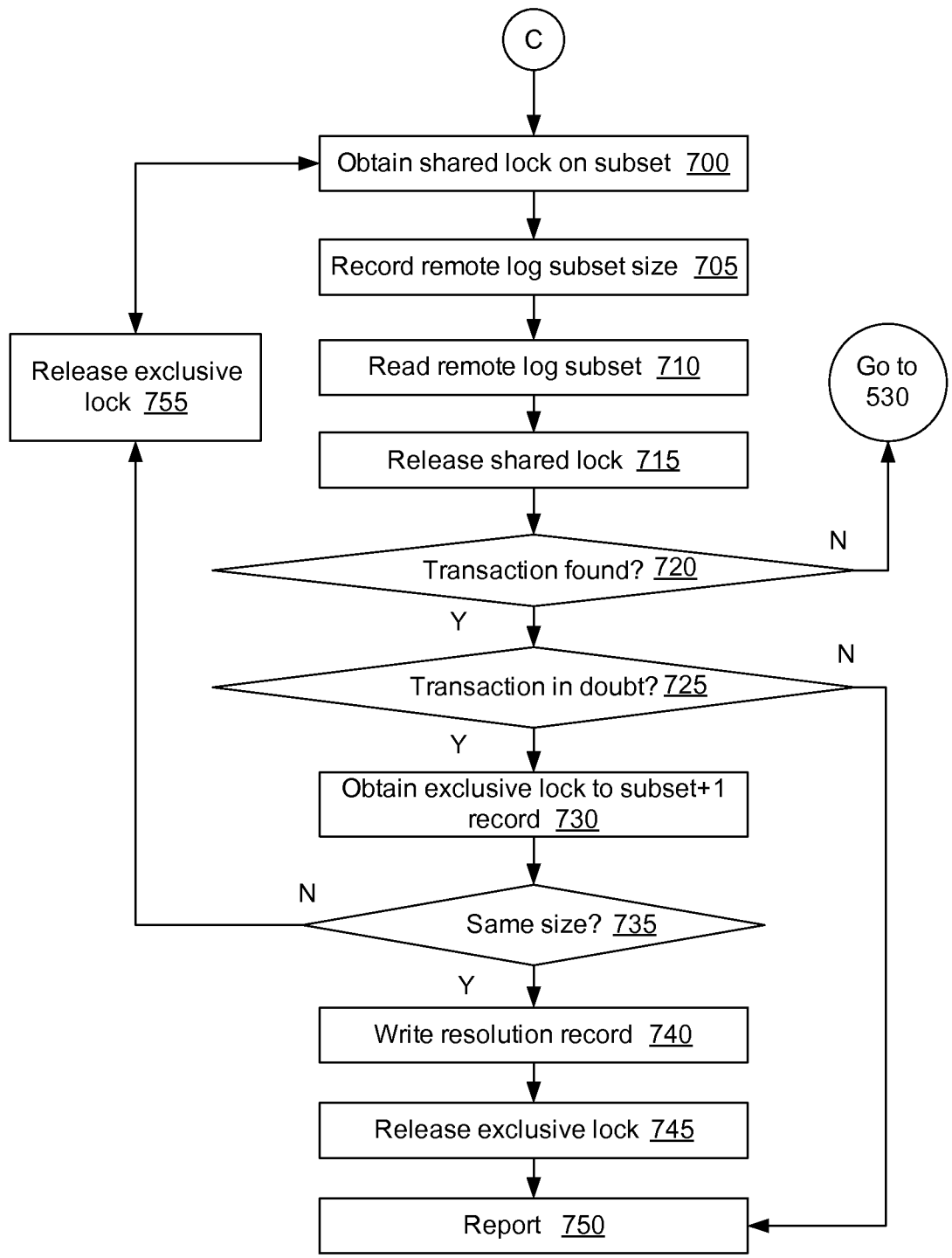
FIG. 7 is a flow chart showing the operational steps involved in a fourth transaction processing process.

In response to a determination that there are further inactive resource managers in the group, a sub-flow can be executed. Three such sub-flows are shown in FIGS. 5B, 6, and 7 and will be described herein.

Figure 5A:
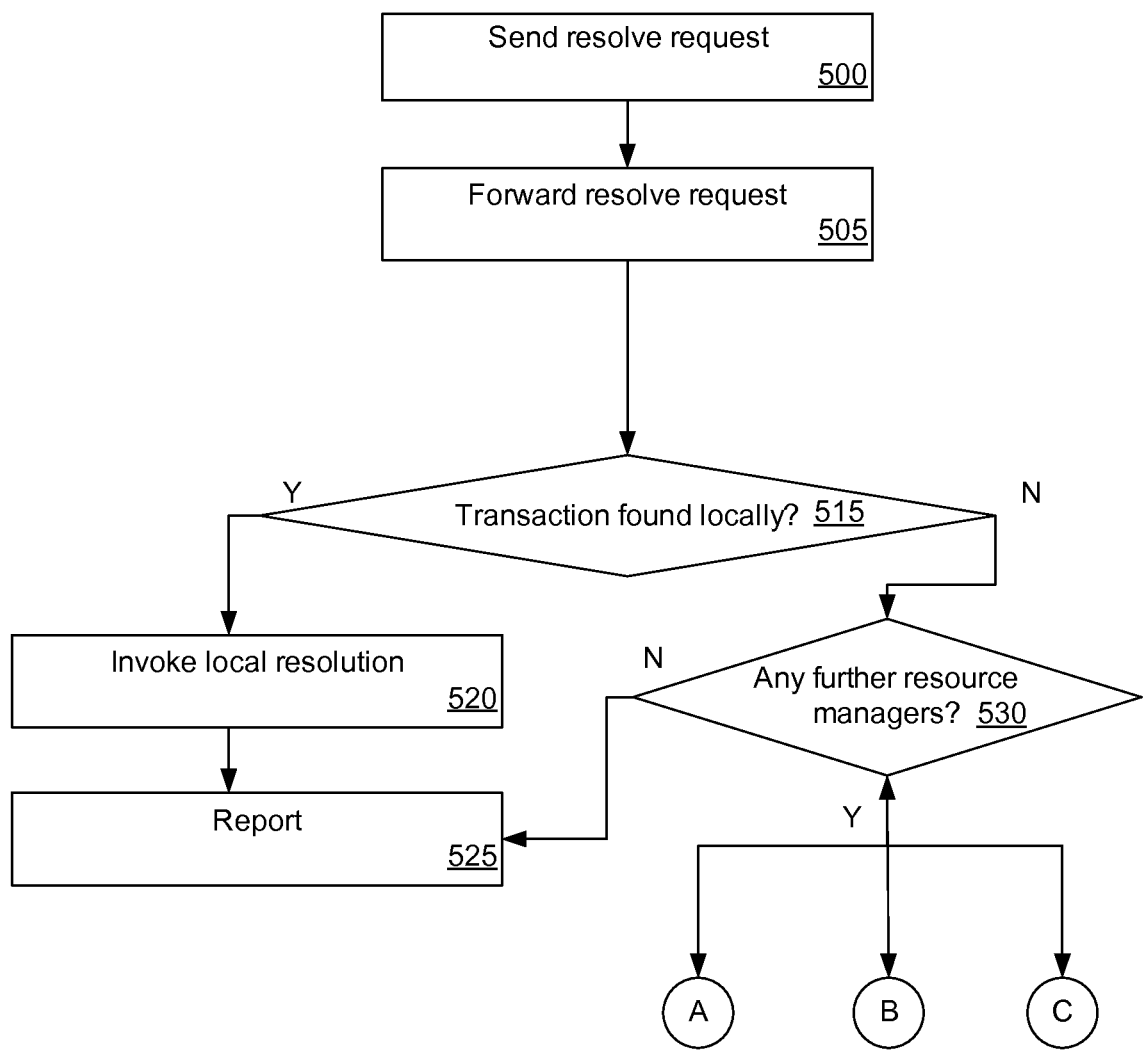
FIG. 5A is a flow chart showing the operational steps involved in a first transaction processing process.
Figure 5B:
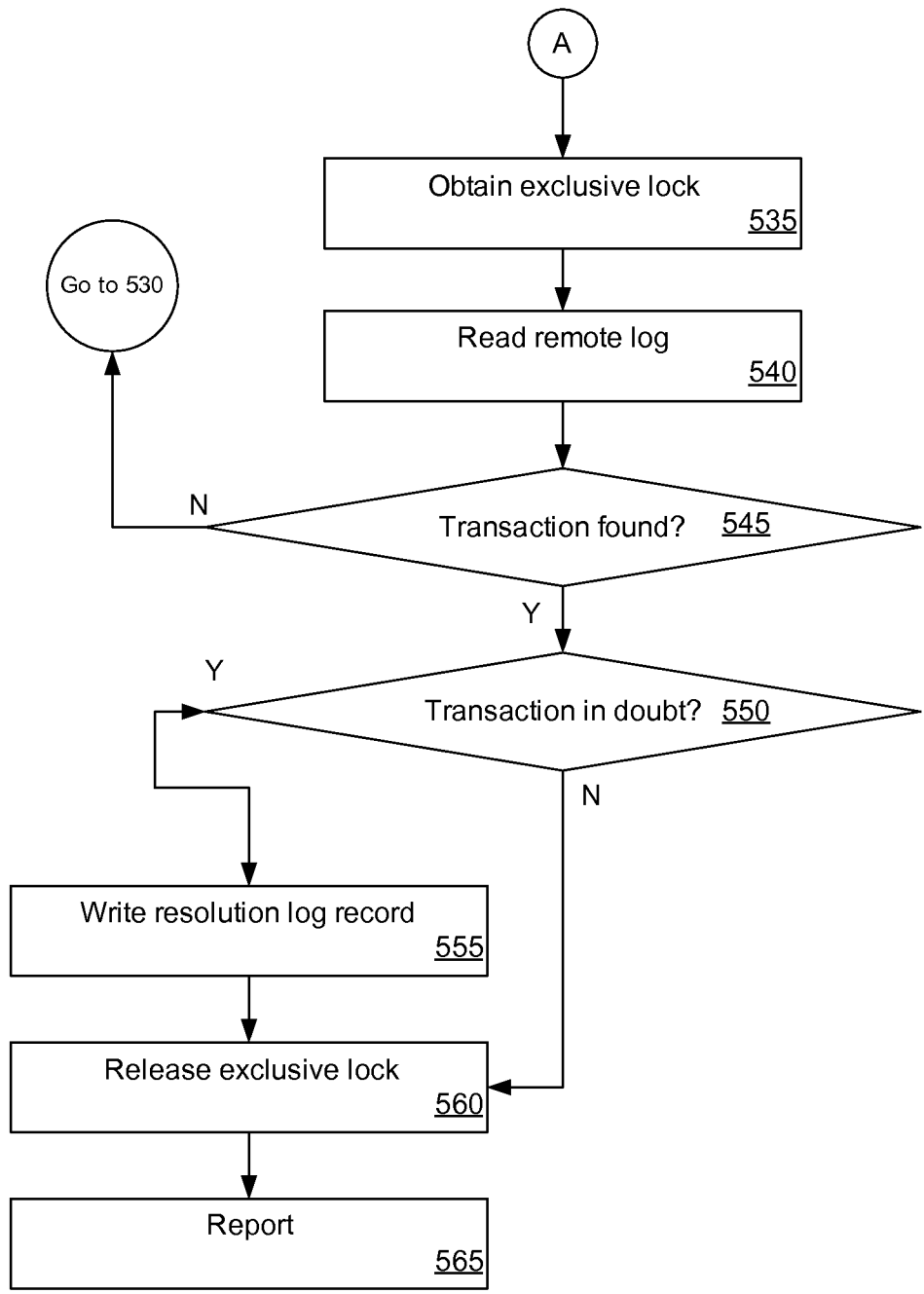
FIG. 5B is a flow chart showing the operational steps involved in a second transaction processing process.

With reference to a first sub-flow of FIG. 5B, the first resolve component 405 determines that there is an inactive resource manager in the group, namely, the fourth resource manager 340.

At step 535, the first logging component 415 obtains an exclusive lock on the fifth log 355 associated with the fourth resource manager 340.

Note also that the use of an exclusive lock ensures that transactionality is preserved as no other resource manager can access the log for updating.

In response, the first logging component 415 accesses, opens and reads (step 540) the fifth log 355 to search for the transaction identifier, T_1. After reading the fifth log 355, the first logging component 415 closes the fifth log 355.

Note that this is a more involved process than simply reading a "local" log (e.g. the fourth log 350).

Note that the reading of a log can be executed in a number of ways, e.g. wherein a log is read from start to finish, wherein a checkpoint is used to record a current state of a resource manager, the logging component 415 records a checkpoint and reads any log records subsequently recorded.

At step 545, if the transaction identifier is not found, control passes to step 530 of FIG. 5A.

If the transaction identifier is found, the first logging component 415 checks (step 550) whether the associated entry has an in-doubt state.

If the associated entry is not in an in-doubt state, the first logging component 415 reads the associated transaction state and releases (step 560) the exclusive lock on the fifth log 355.

Note that the exclusive lock is released as soon as it is not required.

The first logging component 415 sends a result 4) above to the first resolve component 405 which subsequently sends (step 565) the result in a response to the transaction coordinator 320.

In the example herein, the associated entry is in an in-doubt state and the first logging component 415 writes (step 555) the decision to the entry associated with the transaction identifier in order to resolve the transaction.

Subsequently, the first logging component 415 releases (step 560) the exclusive lock on the fifth log 355.

Note that the exclusive lock is released as soon as it is not required.

The first logging component 415 sends a result 1) or 2) above to the first resolve component 405 which subsequently sends (step 565) the result in a response to the transaction coordinator 320.

Having written the decision and prior to the result being sent to the transaction coordinator 320, changes to resources need to be committed or rolled back.

Note that the resources may be shared/private or a combination of both.

Private resources can only be accessed by an owning resource manager and cannot be accessed by any other resource manager in the group.

A shared resource can be accessed by each resource manager in the group.

A transaction may involve changes to private and/or shared resources.

As a private resource can only be accessed by an owning (inactive) resource manager, the first logging component 415 can only write the decision into the log of the inactive resource manager but can not change the private resource.

The inactive resource manager reads the decision written to its log when it restarts and subsequently makes the associated changes to the private resource.

As shared resources can be accessed whilst a resource manager is still inactive, waiting until the inactive resource manager restarts in order to commit or rollback changes to the shared resource is not desirable.

Thus, preferably, the first logging component 415 writes the decision into the log of the inactive resource manager and also commits or rollbacks changes to the shared resource before a result is sent to the transaction coordinator 320, Thus, advantageously, the changes to the shared resources can be made available as soon as possible to the owning application.

In order to, for example, make it easier to allow different versions of resource managers to co-exist in a group or because one resource manager may be prevented from writing to another resource manager's log (e.g., due to security constraints), another shared log can be used to write a resolution record (e.g. such as another file on disk; more than one other file on disk; a sequence of records in a shared resource managed by the group of resource managers). Note that such a log will need to be checked in order to determine whether the transaction is in doubt. Note that an exclusive lock for writing a resolution record will have to be obtained on such a log. If such a log is used, each resource manager must use only the shared log to write resolution records and each resource manager in the group must check it for resolutions during their restart processing.

Note that a lock is not obtained by one resource manager e.g., immediately in response to another resource manager failing. Rather, as step 535 is responsive to the resolution request sent by the transaction coordinator 320 at step 500, the process is relatively lightweight in that a lock is obtained in response to a request from the transaction coordinator 320 and until that time, resources can be used freely. Note also that a lock is released as soon as it is not required. In the case where multiple transaction coordinators were originally connected to a failed resource manager, this flexibility also allows each transaction coordinator to connect to any resource manager in the group in order to resolve an in-doubt transaction.

With reference to the preferred embodiment, in response to receiving a notification 1) above, the transaction coordinator 320 can forget the transaction.

In response to receiving notification 2) above, the transaction coordinator 320 resends a resolve request at some point in the future.

In response to receiving notification 3) above, the transaction coordinator 320 assumes that the transaction was completed correctly and forgets the transaction.

In response to receiving notification 4) above, the transaction coordinator 320 can forget the transaction.

Advantageously, according to the preferred embodiment, an in-doubt transaction can be resolved quickly (because the transaction is not in doubt for a large period of time); without data loss; and without requiring significant changes to the transaction processing system.

Note that advantageously, even though the fourth resource manager 345 is inactive and the transaction is in doubt, the third resource manager 335 can access the fifth log 355 of the fourth resource manager 345 in order to aid resolution of the transaction.

Note also that advantageously, because the group of resource managers are inter-connected, any of the resource managers can concurrently attempt to resolve transactions (although actual resolution is serialized by using exclusive locks).

Note also that advantageously, because the group of resource managers are inter-connected, the transaction coordinator 320 can connect to any of the resource managers in order to resolve the transaction.

A second sub-flow (alternative to the first sub-flow of FIG. 5B) according to the preferred embodiment will be described with reference to FIG. 6, wherein prior to processing, a failure occurs and the transaction is in doubt.

With reference to FIG. 6, the first resolve component 405 determines that there is an inactive resource manager in the group, namely, the fourth resource manager 340.

At step 600, the first logging component 415 obtains a shared lock on the fifth log 355 associated with the fourth resource manager 340.

Note that use of a shared lock allows other resource managers to concurrently read the fifth log 355 allowing for load balancing and improving performance.

In response, the first logging component 415 checks and records (step 605) the size of the fifth log 355.

In the example herein, the size has a value "sz".

The first logging component 415 further opens and reads (step 610) the fifth log 355 to search for the transaction identifier, T_1.

After reading, the first logging component 415 releases (step 615) the shared lock.

At step 620, responsive to the reading step, if the transaction identifier is not found, control passes to step 530 of FIG. 5A.

If the transaction identifier is found, the first logging component 415 checks (step 625) whether the associated entry has an in-doubt state.

If the associated entry is not in an in-doubt state, the first logging component 415 sends a result 4) above to the first resolve component 405 which subsequently sends (step 650) the result in a response to the transaction coordinator 320.

If the associated entry is in an in-doubt state, the first logging component 415 obtains (step 630) an exclusive lock on the fifth log 355.

Note that obtaining an exclusive lock before resolving the transaction is important such that more than one resource manager cannot resolve the transaction (which potentially could cause inconsistencies).

At step 635, the first logging component 415 once again checks and records the size of the fifth log 355. In response, the first logging component 415 determines whether the size is the same as that recorded at step 605 (e.g. "sz").

If the size is not the same, this indicates that a change in the log has occurred—the change can be a transaction resolution record inputted by another resource manager in the group. Thus, rather than assuming the transaction is still in doubt, it is preferred that the check is carried out at step 635.

Responsive to a negative outcome, step 635 prompts the first logging component 415 to release the exclusive lock at step 655 and control passes to step 600. An optimization is to modify the first logging component 415 to, once a shared lock is obtained at step 600 and a subset size is recorded at step 605, read only the changed subsets of the fifth log 355 at step 610.

If the size is the same and responsively, the first logging component 415 writes (step 640) the decision to the entry associated with the transaction identifier in order to resolve the transaction.

Subsequently, the first logging component 415 releases (step 645) the exclusive lock on the fifth log 355.

The first logging component 415 sends a result 1) or 2) above to the first resolve component 405, which subsequently sends (step 650) the result in a response to the transaction coordinator 320.

Note that use of a shared lock allows for concurrency, load balancing, and improves performance—and that actual resolution is serialized by using exclusive locks in order to correctly resolve transactions.

A third sub-flow (alternative to the first and second sub-flows of FIGS. 5B and 6 respectively) according to the preferred embodiment will be described with reference to FIG. 7, wherein prior to processing, a failure occurs and the transaction is in doubt.

With reference to FIG. 7, the first resolve component 405 determines that there is an inactive resource manager in the group, namely, the fourth resource manager 340.

At step 700, the first logging component 415 obtains a shared lock on a subset of the fifth log 355 associated with the fourth resource manager 340. Preferably, the subset is associated with the start of the fifth log 355 up to the end of the fifth log 355. Note that if the known mechanism of e.g., checkpoints is used, a subset can be associated with e.g., the last checkpoint up to the end of the fifth log 355.

Note that use of a shared lock allows for concurrency, load balancing, and improves performance.

Note also that locking a selected subset (or "range") of a log, leaves the remainder of the log (including, for example, subsets which do not yet exist) un-locked. Advantageously, this allows for flexibility and for concurrent work to occur, which improves performance.

In response, the first logging component 415 checks and records (step 705) the size of the subset of the fifth log 355.

In the example herein, the size has a value "sz".

The first logging component 415 further opens and reads (step 710) the subset of the fifth log 355, namely, from the start of the fifth log 355 up to a location associated with sz, to search for the transaction identifier, T_1.

After reading, the first logging component 415 releases (step 715) the shared lock.

At step 720, responsive to the reading step, if the transaction identifier is not found, control passes to step 530 of FIG. 5A.

If the transaction identifier is found, the first logging component 415 checks (step 725) whether the associated entry has an in-doubt state.

If the associated entry is not in an in-doubt state, the first logging component 415 sends a result 4) above to the first resolve component 405 which subsequently sends (step 750) the result in a response to the transaction coordinator 320.

If the associated entry is in an in-doubt state, the first logging component 415 obtains (step 730) an exclusive lock on the immediately proceeding location (e.g. the next blank record) on the fifth log 355.

Note that obtaining an exclusive lock before resolving the transaction is important such that more than one resource manager cannot resolve the transaction (which potentially could cause inconsistencies).

Note also that an exclusive lock is obtained only on a subset of the log, leaving the remainder accessible to the other resource managers.

At step 735, the first logging component 415 once again checks and records the size of the subset of the fifth log 355. In response, the first logging component 415 determines whether the size is the same as that recorded at step 705 (i.e. "sz").

If the size is not the same, this indicates that a change in the log has occurred. Responsively, at step 755, the first logging component 415 releases the exclusive lock and control passes to step 700. An optimization is to modify the first logging component 415 to, once a shared lock is obtained at step 700, and a subset size is recorded at step 705, read only the changed subsets of the fifth log 355 at step 710.

If the size is the same, the first logging component 415 writes (step 740) the decision to the entry associated with the transaction identifier to the immediately proceeding location in order to resolve the transaction.

Subsequently, the first logging component 415 releases (step 745) the exclusive lock on the fifth log 355.

The first logging component 415 sends a result 1) or 2) above to the first resolve component 405 which subsequently sends (step 750) the result in a response to the transaction coordinator 320.

Advantageously, the seventh process can be used in environments where it is possible to obtain a lock to a selected subset (or "range") of a log, leaving the remainder of the log (including, for example, subsets which do not yet exist) un-locked. This allows for concurrency, load balancing and improves performance.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the Figures), and that the software may be provided in the form of one or more computer program elements carried on any suitable data-carrier (also not shown in the Figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, will cause the computer system to perform all the steps of the described method.

It will be clear to one skilled in the art that many improvements and modifications can be made to the foregoing exemplary embodiment without departing from the scope of the present invention.

What is claimed is:

1. A computer implemented method for aiding in resolution of transactions with a transaction coordinator and a plurality of resource managers using one or more processors to perform operations comprising:

in response to a communications failure between a transaction coordinator and a first resource manager of a plurality of resource managers within a transactional processing system, connecting, by the transaction coordinator, to a second resource manager, the communications failure associated with an in-doubt state of a transaction;

determining an association of the transaction with the first resource manager and an in-doubt state of the transaction, data associated with the transaction being in a first subset of a log of the first resource manager;

based on the association and the in-doubt state of the transaction, obtaining a shared lock on a second subset of the log, the lock permitting one or more resource managers to access the log and preventing the first resource manager from accessing the second subset of the log;

determining a difference in sizes of the first subset and the second subset after obtaining the shared lock;

in response to determining the difference in sizes, releasing the shared lock;

in response to releasing the shared lock, obtaining a subsequent lock on the second subset of the log, the subsequent lock being an exclusive lock obtained by a specified resource manager;

in response to determining sizes of the first subset and the second subset are different, repeating obtaining one or more additional exclusive locks on a changed portion of the second subset of the log;

in response to determining the sizes of the first subset and the second subset are the same, writing, by the specified resource manager, a resolution to the log of the first resource manager; and releasing the one or more additional exclusive locks responsive to writing the resolution of the log.

2. The computer implemented method of claim 1, wherein the specified resource manager is the second resource manager.

3. The computer implemented method of claim 1, further comprises:

transmitting, by the specified resource manager, a result to the transaction coordinator via a logging component, the result being representative of writing the resolution to the log of the first resource manager.

4. The computer implemented method of claim 1, further comprising:
recording a first size of the first subset of the log;
based on the first size of the first subset of the log, determining, by the second resource manager, that the transaction is associated with the first resource manager;
recording a second size of the second subset of the log; and
comparing the second size and the first size.

5. The computer implemented method of claim 4, wherein the in-doubt state of the transaction is determined in response to the association of the transaction with the first resource manager and comparing the second size and the first size.

6. The computer implemented method of claim 4, further comprising:
based on determining sizes of the first subset and the second subset and comparing the second size and the first size, sending, by the transaction coordinator, a resolve request comprising a resolution for the transaction;
in response to receiving the resolve request, obtaining the shared lock to data associated with the transaction;
reading the first subset of the log associated with the transaction;
based on reading the first subset, identifying a transaction identifier within the first subset of the log, the transaction identifier being associated with the transaction; and
wherein the second resource manager releases the shared lock in response to identifying the transaction identifier.

7. The computer implemented method of claim 4, further comprising:
reading the first subset of the log associated with the transaction;
based on reading the first subset, determining the first subset of the log lacks a transaction identifier associated with the transaction;
in response to determining the first subset lacks the transaction identifier, identifying a subsequent resource manager within the plurality of resource managers, the subsequent resource manager being a resource manager of the plurality of resource managers in an active state;
identifying, by the subsequent resource manager, the transaction identifier within a subset of the log; and
wherein the subsequent resource manager is the specified resource manager associated with the lock.

8. A system comprising:
one or more processors; and
a computer readable storage medium coupled to the one or more processors, the computer readable storage medium storing program instructions that, when executed by the one or more processors, cause the one or more processors to perform operations comprising:
in response to a communications failure between a transaction coordinator and a first resource manager of a plurality of resource managers within a transactional processing system, connecting, by the transaction coordinator, to a second resource manager, the communications failure associated with an in-doubt state of a transaction;
determining an association of the transaction with the first resource manager and an in-doubt state of the transaction, data associated with the transaction being in a first subset of a log of the first resource manager;
based on the association and the in-doubt state of the transaction, obtaining a shared lock on a second subset of the log, the lock permitting one or more resource managers to access the log and preventing the first resource manager from accessing the second subset of the log;
determining a difference in sizes of the first subset and the second subset after obtaining the shared lock;
in response to determining the difference in sizes, releasing the shared lock;
in response to releasing the shared lock, obtaining a subsequent lock on the second subset of the log, the subsequent lock being an exclusive lock obtained by a specified resource manager;
in response to determining sizes of the first subset and the second subset are different, repeating obtaining one or more additional exclusive locks on a changed portion of the second subset of the log;
in response to determining the sizes of the first subset and the second subset are the same, writing, by the specified resource manager, a resolution to the log of the first resource manager; and
releasing the one or more additional exclusive locks responsive to writing the resolution of the log.

9. The system of claim 8, wherein the specified resource manager is the second resource manager.

10. The system of claim 8, wherein the operations further comprise:
transmitting, by the specified resource manager, a result to the transaction coordinator via a logging component, the result being representative of writing the resolution to the log of the first resource manager.

11. The system of claim 8, wherein the operations further comprise:
recording a first size of the first subset of the log;
based on the first size of the first subset of the log, determining, by the second resource manager, that the transaction is associated with the first resource manager;
recording a second size of the second subset of the log; and
comparing the second size and the first size.

12. The system of claim 11, wherein the in-doubt state of the transaction is determined in response to the association of the transaction with the first resource manager and comparing the second size and the first size.

13. The system of claim 11, wherein the operations further comprise:
based on determining sizes of the first subset and the second subset and comparing the second size and the first size, sending, by the transaction coordinator, a resolve request comprising a resolution for the transaction;
in response to receiving the resolve request, obtaining the shared lock to data associated with the transaction;
reading the first subset of the log associated with the transaction;
based on reading the first subset, identifying a transaction identifier within the first subset of the log, the transaction identifier being associated with the transaction; and
wherein the second resource manager releases the shared lock in response to identifying the transaction identifier.

14. The system of claim 11, wherein the operations further comprise:
reading the first subset of the log associated with the transaction;

based on reading the first subset, determining the first subset of the log lacks a transaction identifier associated with the transaction;

in response to determining the first subset lacks the transaction identifier, identifying a subsequent resource manager within the plurality of resource managers, the subsequent resource manager being a resource manager of the plurality of resource managers in an active state;

identifying, by the subsequent resource manager, the transaction identifier within a subset of the log; and wherein the subsequent resource manager is the specified resource manager associated with the lock.

15. A non-transitory_computer readable storage medium storing program instructions that, when executed by one or more processors of a transactional processing system, cause the one or more processors to perform operations comprising:

in response to a communications failure between a transaction coordinator and a first resource manager of a plurality of resource managers within a transactional processing system, connecting, by the transaction coordinator, to a second resource manager, the communications failure associated with an in-doubt state of a transaction;

determining an association of the transaction with the first resource manager and an in-doubt state of the transaction, data associated with the transaction being in a first subset of a log of the first resource manager;

based on the association and the in-doubt state of the transaction, obtaining a shared lock on a second subset of the log, the lock permitting one or more resource managers to access the log and preventing the first resource manager from accessing the second subset of the log;

determining a difference in sizes of the first subset and the second subset after obtaining the shared lock;

in response to determining the difference in sizes, releasing the lock;

in response to releasing the shared lock, obtaining a subsequent lock on the second subset of the log, the subsequent lock being an exclusive lock obtained by a specified resource manager;

in response to determining sizes of the first subset and the second subset are different, repeating obtaining one or more additional exclusive locks on a changed portion of the second subset of the log;

in response to determining the sizes of the first subset and the second subset are the same, writing, by the specified resource manager, a resolution to the log of the first resource manager; and releasing the one or more additional exclusive locks responsive to writing the resolution of the log.

16. The computer readable storage medium of claim 15, wherein the specified resource manager is the second resource manager.

17. The computer readable storage medium of claim 15, wherein the operations further comprise:

transmitting, by the specified resource manager, a result to the transaction coordinator via a logging component, the result being representative of writing the resolution to the log of the first resource manager.

18. The computer readable storage medium of claim 15, wherein the operations further comprise:

recording a first size of the first subset of the log;

based on the first size of the first subset of the log, determining, by the second resource manager, that the transaction is associated with the first resource manager;

recording a second size of the second subset of the log; and comparing the second size and the first size.

19. The computer readable storage medium of claim 18, wherein the operations further comprise:

based on determining sizes of the first subset and the second subset and comparing the second size and the first size, sending, by the transaction coordinator, a resolve request comprising a resolution for the transaction;

in response to receiving the resolve request, obtaining the shared lock to data associated with the transaction;

reading the first subset of the log associated with the transaction;

based on reading the first subset, identifying a transaction identifier within the first subset of the log, the transaction identifier being associated with the transaction; and wherein the second resource manager releases the shared lock in response to identifying the transaction identifier.

20. The computer readable storage medium of claim 18, wherein the operations further comprise:

reading the first subset of the log associated with the transaction;

based on reading the first subset, determining the first subset of the log lacks a transaction identifier associated with the transaction;

in response to determining the first subset lacks the transaction identifier, identifying a subsequent resource manager within the plurality of resource managers, the subsequent resource manager being a resource manager of the plurality of resource managers in an active state;

identifying, by the subsequent resource manager, the transaction identifier within a subset of the log; and wherein the subsequent resource manager is the specified resource manager associated with the lock.

* * * * *